US012578054B2

(12) United States Patent
Desilets

(10) Patent No.: US 12,578,054 B2
(45) Date of Patent: Mar. 17, 2026

(54) DOUBLE DOOR RETAINER

(71) Applicant: Brian Desilets, Simpsonville, KY (US)

(72) Inventor: Brian Desilets, Simpsonville, KY (US)

( * ) Notice: Subject to any disclaimer, the term of this patent is extended or adjusted under 35 U.S.C. 154(b) by 34 days.

(21) Appl. No.: 18/614,389

(22) Filed: Mar. 22, 2024

(65) Prior Publication Data

US 2025/0297703 A1 Sep. 25, 2025

(51) Int. Cl.
*F16M 13/00* (2006.01)
*E06B 7/28* (2006.01)

(52) U.S. Cl.
CPC .............. *F16M 13/00* (2013.01); *E06B 7/28* (2013.01)

(58) Field of Classification Search
CPC ...... E05B 17/0012; E05C 19/188; E06B 7/16; E06B 7/28; Y10T 292/03; Y10T 292/23; Y10T 292/34; Y10T 292/37
USPC ............................... 52/215; 49/380; 206/325
See application file for complete search history.

(56) References Cited

U.S. PATENT DOCUMENTS

| | | | | | |
|---|---|---|---|---|---|
| 1,689,897 | A | * | 10/1928 | Seymour ................. | E06B 3/984 49/380 |
| 2,742,146 | A | * | 4/1956 | Lester, Jr. ............ | B65D 81/057 49/504 |
| 4,967,905 | A | * | 11/1990 | Steves ................... | B65D 85/64 206/321 |
| 5,809,698 | A | * | 9/1998 | Mori ........................ | E06B 7/00 49/504 |
| 6,029,410 | A | * | 2/2000 | Westberg, II ............ | E06B 7/00 52/204.1 |
| 6,470,637 | B2 | * | 10/2002 | Gratz ........................ | E06B 7/00 52/287.1 |
| 9,518,421 | B2 | * | 12/2016 | Cushwa, Jr. .............. | E06B 9/02 |
| 10,954,051 | B1 | * | 3/2021 | Vanderpan ........... | B65D 81/054 |
| 11,332,295 | B1 | * | 5/2022 | Vanderpan .......... | E04F 21/0023 |
| 12,065,299 | B2 | * | 8/2024 | Farish ................... | B65D 85/64 |
| 2023/0182986 | A1 | * | 6/2023 | Farish ...................... | E06B 7/28 206/325 |
| 2023/0193669 | A1 | * | 6/2023 | DeMaranville ....... | E05C 19/188 292/288 |

* cited by examiner

*Primary Examiner* — Carlos Lugo
(74) *Attorney, Agent, or Firm* — Gray Ice Higdon

(57) ABSTRACT

Implementations are directed towards a double door retainer for restraining a set of double doors. The double door retainer can be attached to a set of double doors to prevent them from swinging about their hinges as they are transported from one location to another. The double door retainer can include a spacer frame having two opposing end walls and front, rear, and bottom walls that extend longitudinally from one end wall to the other. The double door retainer can include one or more guide rails and a positioning tab that align the double doors to the spacer frame. The double door retainer can include one or more fasteners sleeves and one or more apertures in the bottom wall that are aligned with the fastener sleeves so a user can insert a fastener through the apertures into the fasteners sleeves and attach the double door retainer to the double doors.

17 Claims, 4 Drawing Sheets

DOUBLE DOOR RETAINER

BACKGROUND

The present disclosure is directed towards a door retainer which holds double doors in a closed position and protects the doors after manufacturing and during shipment. The double door retainer can fit along the bottom exposed edge of the double doors and will prevent the doors from opening during shipment while also protecting the bottom edge of the doors from damage.

SUMMARY

Techniques are described herein that enable a method and apparatus that include a double door retainer that can be removably attached from a pair of double doors. In some implementations, double doors, when moved from one location to another, are secured into a pre-assembled door frame along with the opening hinges. Door frames typically include two side jambs and a header or head jamb. When the doors are secured to the frame, a set of hinges are attached to each individual door of the set of double doors and then to a respective side jamb. When the doors are secured to the frame in this manner, the outside edges and top edges of the doors are covered by the pre-made frame, while the bottom edges of the doors are exposed and due to the hinges, the doors potentially can swing open. Doors that are transported from one location to another in this manner can be quickly made ready for use because the builder only needs to install the door frame into framing of the structure. However, transporting the doors in this manner can allow the doors to swing freely about their hinges, making transportation more difficult. Transporting double doors in this manner can also increase the likelihood that the doors are damaged if they swing about their hinges and hit another person or object. The double doors can also be damaged when the bottom edge of the doors is exposed, allowing it to scrape across other surfaces or hit another object during transportation. Implementations of a double door retainer described herein can prevent the doors from swinging about their hinges and can cover the bottom edge of the doors, thus enabling more efficient transport and protecting the doors from damage.

In some implementations, the double door retainer can include a longitudinally extending spacer frame. The spacer frame can have two opposing end walls that are joined together by a bottom wall. A front wall and a rear wall can extend between the two opposing end walls and extend upwards from the bottom wall.

The double door retainer can include a pair of guide rails that have a front face and a rear face and can extend upwards from the front wall and rear wall respectively. The guide rails can be on opposing sides of the spacer frame and extend upwards from the spacer frame. Guide rails of a variety of types and shapes can be utilized. For example, the guide rails can be L shaped or in the alternative, simply be upwardly extending frame walls which extend upward directly from the respective front and rear wall.

In some implementations, the double door retainer can include a pair of additional guide rails. The guide rails and additional guide rails can be positioned on opposing ends of the double door retainer. The distance between the guide rails and a first end wall can be the same as a distance between the additional guide rails and an opposing end wall, or, alternatively, the distances can be different such that the guide rails and additional guide rails are in a staggered position relative to the longitudinal axis of the spacer frame.

The spacer frame can also include a positioning tab that extends upwards from the spacer frame. The positioning tab can be configured to fit into a gap between the double doors. In implementations, the positioning tab can have a tapered end. The tapered end can guide the positioning tab into the gap between the double doors when the double door retainer is being aligned with the double doors.

In some implementations, a plurality of fastener sleeves can extend upwards from the bottom wall and be used to secure the double door retainer to the bottom exposed edge of the double doors. The bottom wall can also include one or more apertures. The apertures can align with the plurality of fastener sleeves. A user can insert a fastener through the apertures and into the fastener sleeves when attaching the double door retainer to the double doors.

The above description is provided as an overview of only some implementations disclosed herein. Those implementations, and other implementations, are described in additional detail herein.

DETAILED DESCRIPTION

Figure 1:
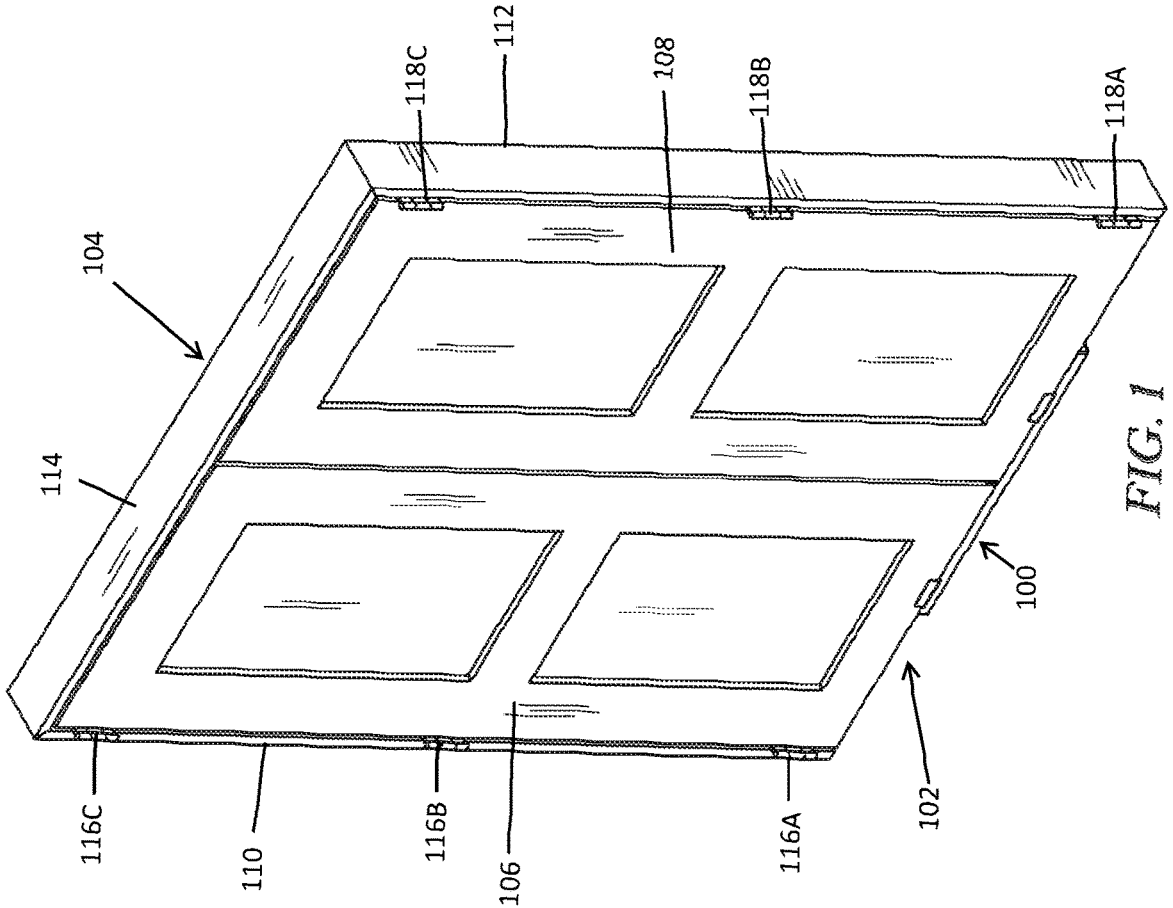
FIG. 1 depicts a top perspective view of a set of double doors inside a frame with the double door retainer attached to the set of double doors.

Turning now to FIG. 1, an example environment that demonstrates various aspects of the present disclosure, and in which implementations disclosed herein can be implemented is depicted. A top perspective view of a set of double doors 102 inside a frame 104 with a double door retainer 100 attached to the set of double doors 102 is illustrated in FIG. 1.

In some implementations, the set of double doors 102 can include a left door 106 and a right door 108. The frame 104 can have a left side jamb 110, a right side jamb 112, and a head jamb 114. The left door 106 can be attached to the left side jamb 110 via left hinges 116A-C and the right door 108 can be attached to the right side jamb 112 via right hinges 118A-C.

Before the double door retainer 100 is attached to the double doors 102, the left door 106 can swing about the left hinges 116A-C and the right door 108 can swing about the right hinges 118A-C. Additionally, before the double door retainer 100 is attached to the double doors 102, the bottom edge and/or surface of the double doors 102 can remain exposed while left side of the left door 106 can be covered by the left side jamb 110, the top of the double doors 102 can be covered by the head jamb 114, and the right side of the right door 108 can be covered by the right side jamb 112.

In some implementations, when the double door retainer 100 is attached to the double doors 102, the bottom of the double doors 102 can be at least partially covered by the double door retainer 100. The double door retainer 100 can also provide an offset between a surface and the exposed bottom surface and/or edges of the double doors 102. For example, if the double doors 102 are set on the ground, the double door retainer 100 provides a protection buffer between the double doors 102 and the ground. Additionally, when the double door retainer 100 is attached to the double doors 102, the left door 106 can be prevented from swinging about the left hinges 116A-C and the right door 108 can be prevented from swinging about the right hinges 118A-C.

The double doors 102 can be made of a variety of materials. For example, the double doors 102 can be wood, aluminum, steel, glass, fiberglass, composite, or any other material that doors are constructed of. Similarly, the double door retainer 100 can be constructed from a variety of materials including plastic, aluminum, steel, wood, a combination of materials, and/or any other construction material that is appropriate for the uses and structures disclosed herein.

For example, in some implementations, the double door retainer 100 may be a plastic injection molded unitary part made from ABS or other durable thermoplastic material. Standard injection molding techniques may be utilized to form the fastener sleeves 218A-D while allowing for continuous flow of molding plastic throughout the entirety of the mold.

Figure 2:
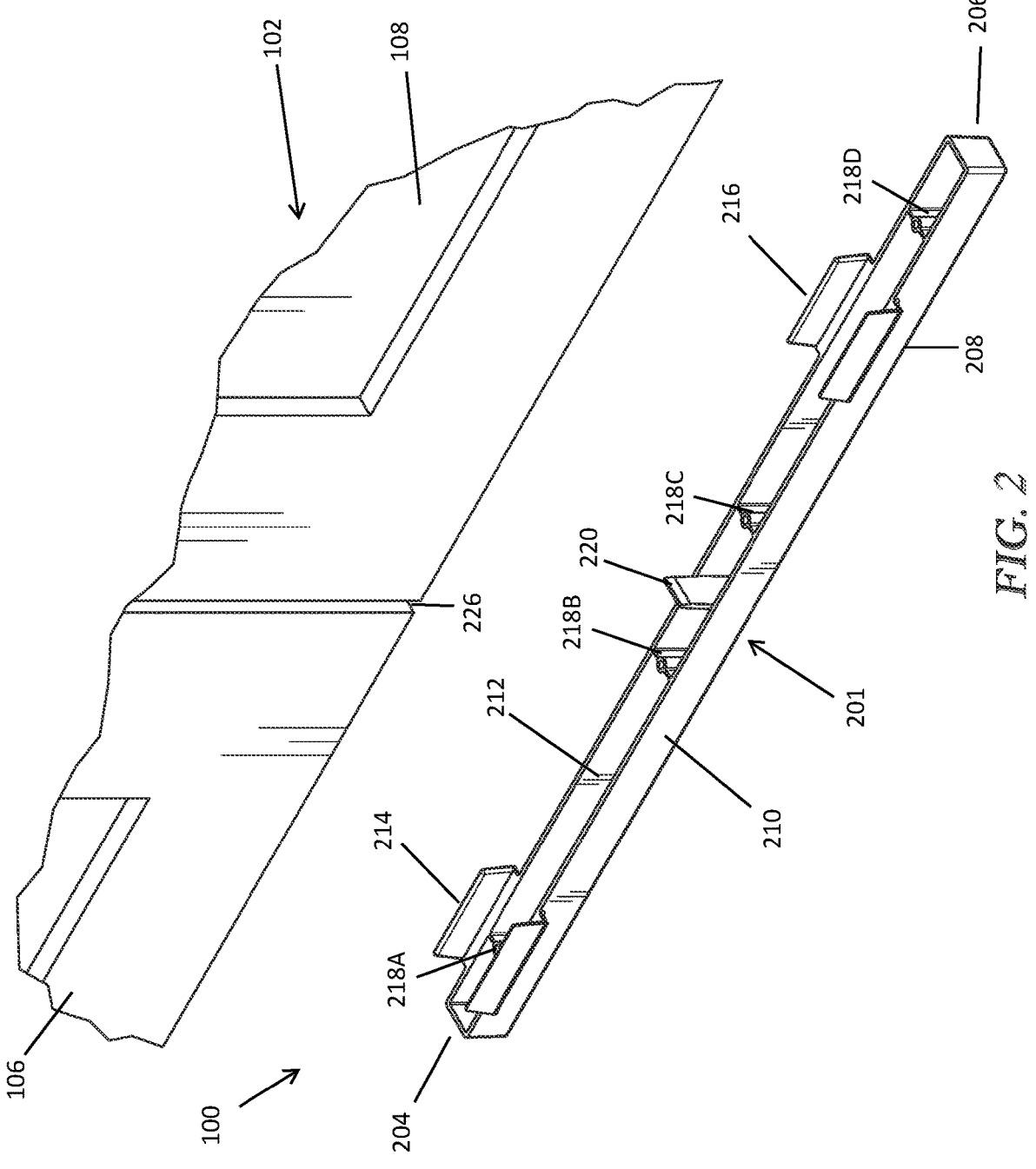
FIG. 2 depicts a top perspective of the double door retainer unattached from the bottom edge of the double doors

Referring now to FIG. 2, a top perspective of a double door retainer 100 unattached from a set of double doors 102 is depicted. The double door retainer 100 can include a spacer frame 201 that has a left end wall 204 and a right end wall 206. A bottom wall 208, a front wall 210, and/or a rear wall 212 can extend longitudinally from the left end wall 204 to the right end wall 206.

In some implementations, the double door retainer 100 can include a pair of guide rails 214. The guide rails 214 can be configured such that when the double door retainer 100 is attached, one of the doors of the double doors 102 will be placed in between the guide rails 214. The guide rails 214 can be positioned such that they are closer to either the left end wall 204 or the right end wall 206. The guide rails 214 may also be positioned so that they are centered on the spacer frame 201.

Alternatively, the double door retainer 100 can also include a pair of additional guide rails 216. The guide rails 214 and the additional guide rails 216 can be positioned such that they are same distance from the left end wall 204 and the right end wall 206, respectively. However, the guide rails 214 can alternatively be positioned such that they are closer to the left end wall 204 than the additional guide rails 216 are to the right end wall 206. The distance between the additional guide rail 216 and the right end wall 206 can, in some implementations, be smaller than the distance between the guide rails 214 and the left end wall 204, such that the guide rails 214 and the additional guide rails 216 are staggered. The staggered guide rails 214 and additional guide rails 216 can for multiple double door retainers 100 to be stacked together and stored/transported more efficiently.

Similarly, in some embodiments, the guide rails 214 and additional guide rails 216 may include a top edge which is slightly beveled or angled to ease installation of the door between the guide rails 214 additional guide rails 216.

The left end wall 204 and the right end wall 206 may be configured in some implementations such that their width is not greater than the width of the bottom edge of the double doors 102. In these implementations, the guide rails 214 and/or the additional guide rails 216 can extend horizontally from the spacer frame 201 before extending vertically. In this configuration, when a user is aligning the double door retainer 100 with the double doors 102 before attaching the double door retainer 100, the front and rear faces of the double doors 102 will fit between the guide rails 214 and/or the additional guide rails 216.

In other implementations, the width of the left end wall 204 and the right end wall 206 can be equal to or greater than the width of the bottom edge of the double doors 102. In these implementations, the guide rails 214 and/or additional guide rails 216 can optionally extend vertically from the spacer frame 201 without extending horizontally. The guide rails 214 and additional guide rails 216 are described in further detail with respect to FIG. 3.

The double door retainer 100 can also include fastener sleeves 218A-D. The fastener sleeves 218A-D can extend upwards from the bottom wall 208. The fastener sleeves 218A-D can additionally and/or alternatively extend from the front wall 210 to the rear wall 212. In some implementations, the double door retainer 100 can include all fastener sleeves 218A-D. Alternatively, the double door retainer 100 can include any other combination of fastener sleeves 218A-D. For example, the double door retainer 100 can include only fastener sleeves 218A and 218D, fastener sleeves 218B or 218C, or any other combination therein. The double door retainer 100 may also include fastener sleeves that are in addition to fastener sleeves 218A-D.

The fastener sleeves 218A-D can be configured to receive a fastener and guide it into place in the double doors 102 when the double door retainer 100 is being attached to the double doors 102. For example, the fastener sleeves 218A-D can be configured to receive screws, nails, bolts or any other fastening device. The fastener sleeves 218A-D can assist a user in quickly and efficiently securing the fasteners into the bottom surface of the double doors 102 and reduce damage to the double doors 102 that can occur as a result of improperly attaching the double door retainer 100.

In some implementations, the double door retainer 100 can include a positioning tab 220 that extends upwards from the spacer frame 201. The positioning tab 220 can extend upwards from the bottom wall 208, and/or can be optionally attached to the front wall 210 and rear wall 212. Additionally, the positioning tab 220 is configured such that it fits into a gap 226 between a left door 106 and a right door 108 of the set of double doors 102. The positioning tab 220 can be tapered on one end. The tapered end of the positioning tab 220 can allow the positioning tab 220 to be more easily guided into the gap 226 between the left door 106 and the right door 108.

The positioning tab 220 can assist a user in aligning the double door retainer 100 with the set of double doors 102 when in the process of attaching the double door retainer 100. The positing tab 220 can be generally centered in the spacer frame 201. In some implementations, this can divide the double door retainer 100 generally into two parts. When the double door retainer 100 is attached to the double doors 102 and the positioning tab 220 is inserted into the gap 226, part of the double door retainer 100 can be aligned with the left door 106 and another part of the double door retainer 100 can be aligned with the right door 108.

In these implementations, the guide rails 214 can be aligned with the left door 106 and the additional guide rails 216 can be aligned with the right door 108. The double door retainer 100 can also only include guide rails 214, which can be centered on the spacer frame 201, such that a portion of both the left door 106 and the right door 108 are covered by the guide rails 214 when the positioning tab 220 is inserted into the gap 226. When the positioning tab 220 is inserted into the gap 226, one or more of the fastener sleeves 218A-D can be aligned with the left door 106 and one or more of the fastener sleeves 218A-D can be aligned with the right door 108. For example, fastener sleeves 218A-B can be aligned with the left door 106 and fastener sleeves 218C-D can be aligned with the right door 108. When the double door retainer 100 is attached to the double doors 102 in these implementations, at least one fastener can be attached to the left door 106 and at least one fastener can be attached to the right door 108.

Figure 3:
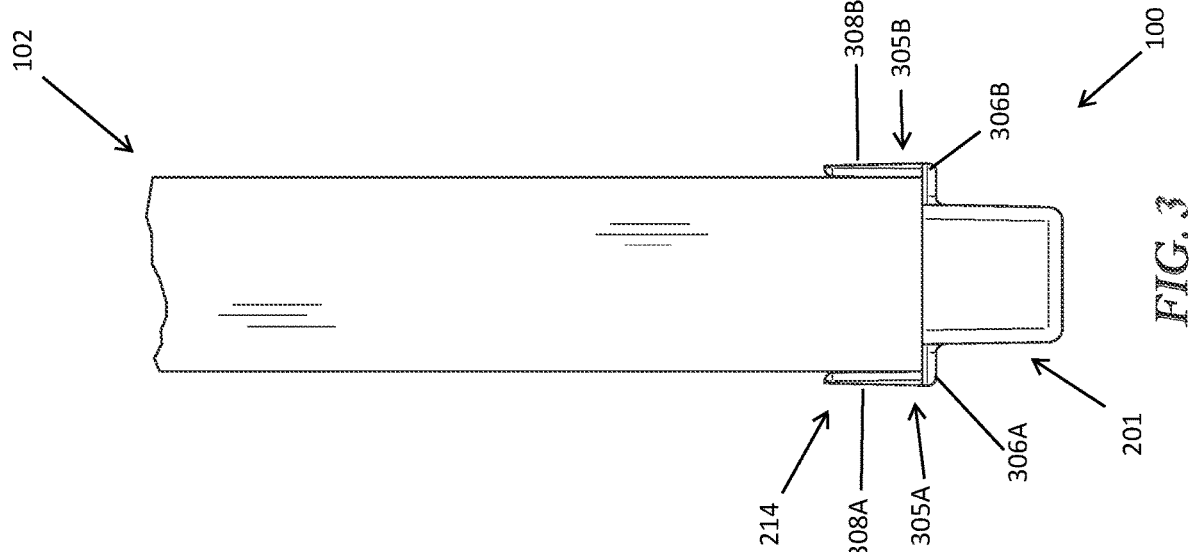
FIG. 3 depicts a side view of a set of double doors with the double door retainer attached to the double doors.

Turning now to FIG. 3, a side view of a double door retainer 100 attached to a set of double doors 102 is depicted. As described above with respect to FIG. 2, the double door retainer 100 can include a pair of guide rails 214 that can be attached to the spacer frame 201. The descriptions herein of the guide rails 214 are not intended to be an inclusive description of a single set of guide rails, but rather any and all guide rails that may be attached to the double door retainer 100. The guide rails 214 can include a front guide rail 305A and a rear guide rail 305B. The front and rear guide rails 305A-B can directly oppose one another from opposite sides of the spacer frame 201. Alternatively, the front and rear guide rails 305A-B can be staggered such that they do not directly oppose one another.

As well the gap, or space, between the front and rear guide rails 305A-B can be such that the door fits tightly there between. For example, in some implementations, a standard interior door may be 1⅜ inches in width and the space or gap between the front and rear guide rails 305A-B may be slightly less so that the door fits tightly between them. Further in some implementations, the top edge of each of the front and rear guide rails 305A-B may be beveled or slightly angled to allow for the ready insertion of the door there between. For example, a double door retainer 100 may be designed for an interior door width of a standard 1⅜ inch width and the guide rails may be slightly less, for example 1¼ inch width. Or, alternatively, the guide rail gap may match the standard gap of the door or be slightly wider to enable easier installation of the double door retainer 100 onto the bottom edge of the double doors 102.

In some implementations, the guide rails 214 can be L-shaped or alternatively may simply extend upward from the front wall 210 and rear wall 212 of the spacer frame 201. The guide rails 214 can include a flange 306A-B that extends horizontally from the spacer frame 201, and/or a vertical support 308A-B that extends vertically from the flange 306A-B. Alternatively, the vertical supports 308A-B can extend directly from the spacer frame 201. When the double doors 102 are attached and/or being attached to the double door retainer 100, the flanges 306A-B can contact the bottom of the double doors 102. The vertical supports 308A-B can contact the front and rear face of the double doors 102. In this way, the spacer frame 201 can be properly aligned on the double doors 102 when the double door retainer 100 is being attached.

Figure 4:
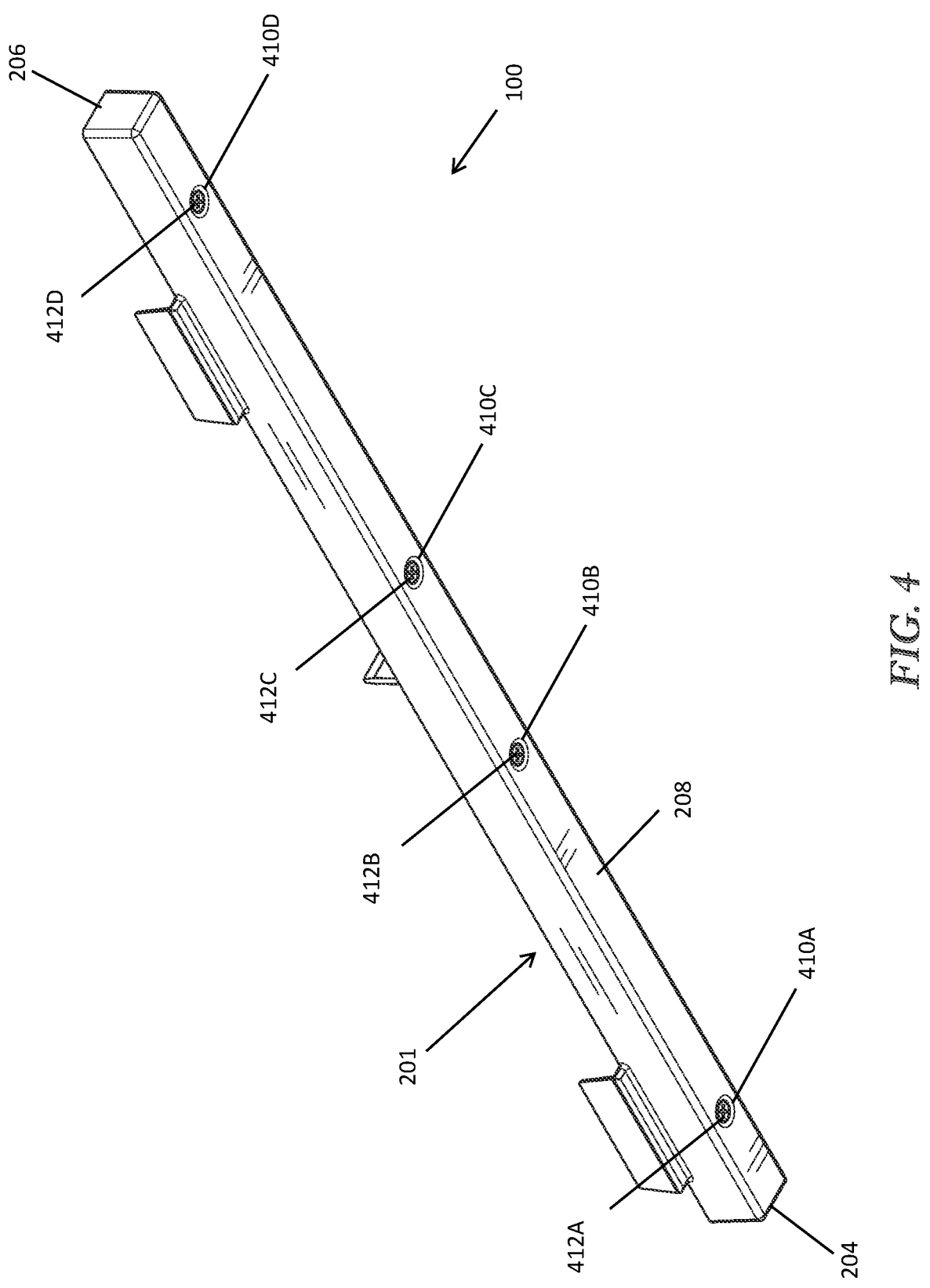
FIG. 4 depicts a bottom perspective of the double door retainer

Turning now to FIG. 4, a bottom perspective of a double door retainer 100 is depicted. As described with respect to FIG. 2, to double door retainer 100 can include a spacer frame 201. The spacer frame 201 can include a left end wall 204 and a right end wall 206. The left end wall 204 can be joined to the right end wall 206 by a bottom wall 208. The bottom wall 208 can include apertures 410A-D. When the double door retainer 100 is being secured to a set of double doors 102, fasteners 412A-D can be passed through the apertures 410A-D into fastener sleeves 218A-D as described with respect to FIG. 2. In some implementations, the bottom wall 208 can include all apertures 410A-D. Alternatively, the bottom wall 208 can include fewer apertures or additional apertures. For example, the bottom wall 208 may only include apertures 410A and 410D or only include apertures 410B and 410C.

The apertures 410A-D can of a sufficient depth in the bottom wall 208 that when fasteners 412A-D are inserted through the apertures 410A-D, the fasteners 412A-D are at least partially concealed so that they do not protrude from the bottom wall 208. This can allow the bottom wall 208 to be laid flat against a surface, which can allow double doors 102 that have the double door retainer 100 attached to be stored and shipped more easily.

What is claimed is:

1. A double door retainer for holding a set of double doors, comprising:
  a longitudinally extending spacer frame, the spacer frame having first and second opposing end walls and a bottom wall extending between the first and the second end wall, and a front and rear side wall extending upwards from the bottom wall and extending between the first and the second end wall;
  at least one pair of guide rails having a first flange, a first vertical support a second flange, and a second vertical support, wherein the first flange extends away from the front side wall, the second flange extends away from the rear side wall, the first vertical support extends upwards from the first flange, and the second vertical support extends upwards from the second flange;
  a positioning tab extending upwards from the spacer frame, wherein the positioning tab is configured to be received between a first door and a second door of the set of double doors; and
  a plurality of fastener sleeves extending upwards from the bottom wall, wherein the plurality of fastener sleeves are configured to receive one or more fasteners to secure the double door retainer to the set of double doors.

2. The double door retainer of claim 1, wherein the at least one pair of guide rails are L-shaped.

3. The double door retainer of claim 1, wherein the at least one pair of guide rails is substantially the same distance from the first end wall and the second end wall.

4. The double door retainer of claim 1, wherein the at least one pair of guide rails includes a first pair of guide rails and a second pair of guide rails positioned on opposite ends of the double door retainer.

5. The double door retainer of claim 4, wherein the first pair of guide rails and the second pair of guide rails are positioned on opposing ends of the double door retainer.

6. The double door retainer of claim 4, wherein a first distance between the first guide rails and the first end wall is less than a second distance between the second guide rails and the second end wall.

7. The double door retainer of claim 1, wherein the positioning tab has a tapered end.

8. The double door retainer of claim 1, wherein the bottom wall includes one or more apertures.

9. The double door retainer of claim 8, wherein the one or more apertures are aligned with the plurality of fastener sleeves.

10. The double door retainer of claim 1, wherein a first fastener sleeve of the plurality of fastener sleeves is positioned closer to the first end wall than then second end wall and a second fastener sleeve of the plurality of fastener sleeves is positioned closer to the second end wall than the first end wall.

11. A double door retainer for holding a set of double doors, comprising:
  a longitudinally extending spacer frame, the spacer frame having first and second opposing end walls and a bottom wall extending between the first and the second end wall, and a front and rear side wall extending upwards from the bottom wall and extending between the first and the second end wall, wherein the bottom wall includes one or more apertures;

at least one pair of guide rails having a first flange, a first vertical support and a second flange, and a second vertical support, wherein the first flange extends away from the front side wall, the second flange extends away from the rear side wall, the first vertical support extends upwards from the first flange, and the second vertical support extends upwards from the second flange;

a positioning tab extending upwards from the spacer frame, wherein the positioning tab is configured to be received between a first door and a second door of the set of double doors.

12. The double door retainer of claim 11, wherein the at least one pair of guide rails are L-shaped.

13. The double door retainer of claim 11, wherein the at least one pair of guide rails is substantially the same distance from the first end wall and the second end wall.

14. The double door retainer of claim 11, wherein the at least one pair of guide rails includes a first pair of guide rails and a second pair of guide rails positioned on opposite ends of the double door retainer.

15. The double door retainer of claim 14, wherein the first pair of guide rails and the second pair of guide rails are positioned on opposing ends of the double door retainer.

16. The double door retainer of claim 14, wherein a first distance between the first guide rails and the first end wall is less than a second distance between the second guide rails and the second end wall.

17. The double door retainer of claim 11, wherein the positioning tab has a tapered end.

\* \* \* \* \*